(12) United States Patent
Onishi

(10) Patent No.: US 12,275,399 B2
(45) Date of Patent: Apr. 15, 2025

(54) DRIVING CONTROL METHOD AND DRIVING CONTROL DEVICE

(71) Applicant: Nissan Motor Co., Ltd., Yokohama (JP)

(72) Inventor: Takeshi Onishi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 18/709,746

(22) PCT Filed: Nov. 15, 2021

(86) PCT No.: PCT/JP2021/041876
§ 371 (c)(1),
(2) Date: May 13, 2024

(87) PCT Pub. No.: WO2023/084767
PCT Pub. Date: May 19, 2023

(65) Prior Publication Data
US 2024/0425045 A1 Dec. 26, 2024

(51) Int. Cl.
*B60W 30/12* (2020.01)
*B60W 50/023* (2012.01)

(52) U.S. Cl.
CPC .......... *B60W 30/12* (2013.01); *B60W 50/023* (2013.01); *B60W 2720/106* (2013.01)

(58) Field of Classification Search
CPC .............. B60W 30/12; B60W 50/023; B60W 2720/106
See application file for complete search history.

(56) References Cited

U.S. PATENT DOCUMENTS 5,822,709 A * 10/1998 Fujita ............... B60T 8/445
 701/72
2011/0015850 A1* 1/2011 Tange ............... B60W 30/12
 701/116

(Continued)

FOREIGN PATENT DOCUMENTS

CN 107735302 A 2/2018
CN 113525368 A 10/2021
(Continued)

OTHER PUBLICATIONS

DE-112017002524-T5 translation (Year: 2019).*

*Primary Examiner* — Kyle T Johnson
(74) *Attorney, Agent, or Firm* — Young Basile Hanlon & MacFarlane, P.C.

(57) ABSTRACT

A driving control device executes driving assistance control for a subject vehicle using a processor having a first controller and a second controller. The first controller executes lane keeping control while the second controller executes deviation preventing control. The processor determines whether or not the second controller starts the deviation preventing control during execution of the lane keeping control with the first controller. Upon a determination that the second controller starts the deviation preventing control during execution of the lane keeping control, the processor concludes the lane keeping control under execution, starts deceleration control for the subject vehicle, continues the deviation preventing control until the subject vehicle stops, and concludes the deviation preventing control under execution when the subject vehicle stops by the deceleration control.

5 Claims, 3 Drawing Sheets

(56) References Cited

U.S. PATENT DOCUMENTS

| | | | |
|---|---|---|---|
| 2012/0221168 A1* | 8/2012 | Zeng | B60W 60/0018 |
| | | | 701/1 |
| 2015/0039185 A1* | 2/2015 | Kim | B60W 10/10 |
| | | | 701/41 |
| 2015/0274163 A1* | 10/2015 | Terazawa | B60W 10/20 |
| | | | 701/41 |
| 2016/0137224 A1* | 5/2016 | You | B62D 6/003 |
| | | | 701/41 |
| 2018/0037216 A1 | 2/2018 | Otake | |
| 2018/0037223 A1* | 2/2018 | Goto | G05D 1/0231 |
| 2018/0154938 A1 | 6/2018 | Kataoka | |
| 2018/0194364 A1 | 7/2018 | Asakura et al. | |
| 2018/0229726 A1* | 8/2018 | Ikeda | B60W 10/20 |
| 2018/0229738 A1* | 8/2018 | Nilsson | B60T 7/12 |
| 2019/0071098 A1* | 3/2019 | Asakura | G08G 1/167 |
| 2019/0258251 A1* | 8/2019 | Ditty | G05D 1/0274 |
| 2020/0070661 A1* | 3/2020 | Akuzawa | B60L 3/0023 |
| 2020/0255009 A1 | 8/2020 | Ikeda et al. | |
| 2020/0307632 A1* | 10/2020 | Tsuji | B60W 60/0059 |
| 2021/0018921 A1* | 1/2021 | Singuru | B60W 30/12 |
| 2021/0163021 A1* | 6/2021 | Frazzoli | H04W 4/48 |
| 2022/0108604 A1* | 4/2022 | Duggal | G08G 1/0133 |
| 2022/0118974 A1 | 4/2022 | Ikeda et al. | |
| 2022/0194371 A1* | 6/2022 | Kvieska | B60W 30/18145 |
| 2022/0315044 A1* | 10/2022 | Tamura | G06V 20/588 |
| 2024/0239358 A1* | 7/2024 | She | B60W 60/00186 |
| 2024/0425045 A1* | 12/2024 | Onishi | B60W 50/023 |

FOREIGN PATENT DOCUMENTS

| | | | | |
|---|---|---|---|---|
| DE | 112017002524 T5 * | 1/2019 | | B60T 8/00 |
| JP | 2015-069341 A | 4/2015 | | |
| JP | 2018-022365 A | 2/2018 | | |
| JP | 2018-090043 A | 6/2018 | | |
| JP | 2018-131081 A | 8/2018 | | |
| JP | 2019-051894 A | 4/2019 | | |
| JP | 2019-111866 A | 7/2019 | | |

* cited by examiner

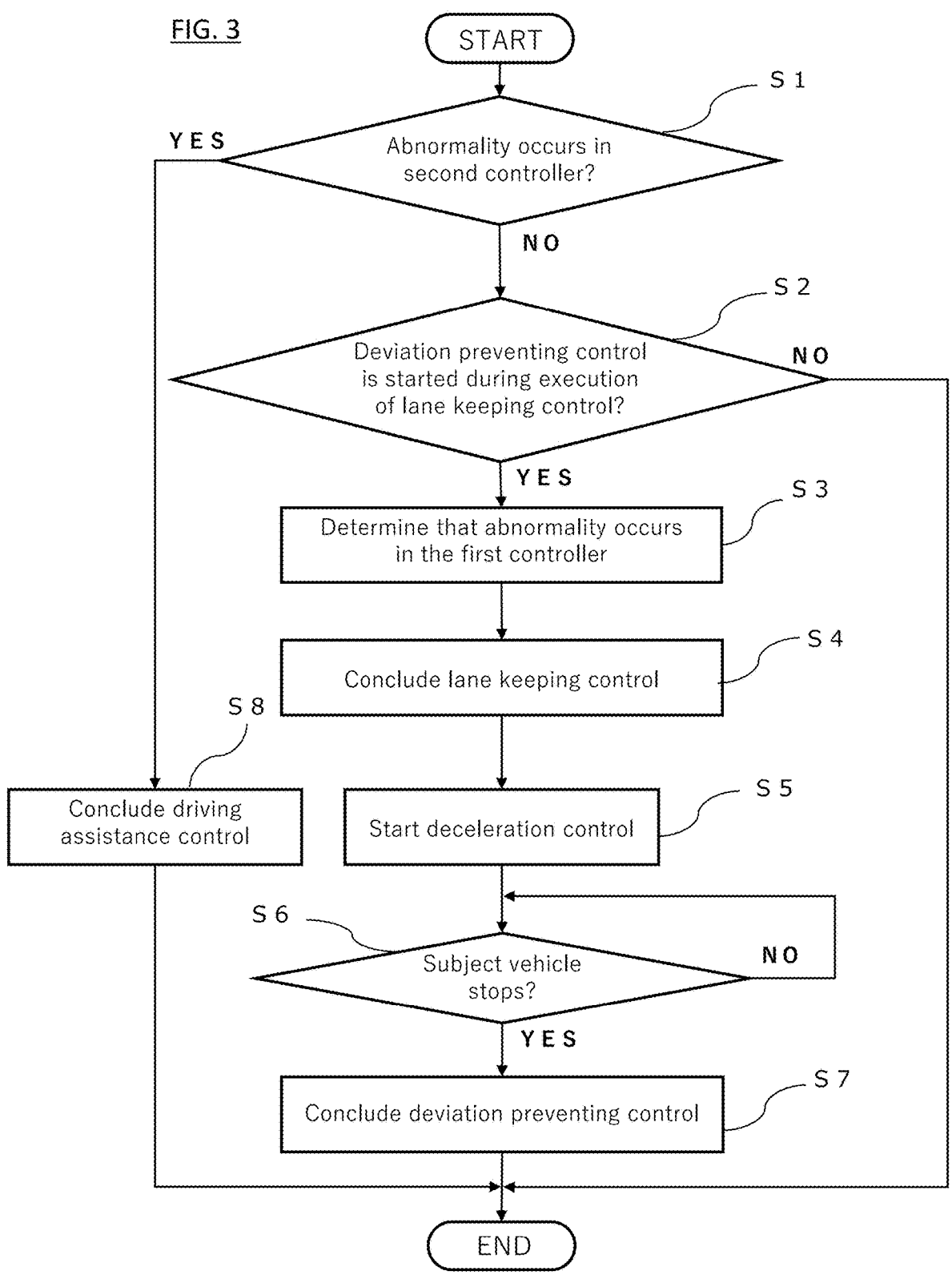

DRIVING CONTROL METHOD AND DRIVING CONTROL DEVICE

TECHNICAL FIELD

The present invention relates to a driving control method and a driving control device.

BACKGROUND

The driving control device described in JP2015-069341A executes lane keeping control or deviation preventing control in accordance with the lane width of a travel lane in which a subject vehicle travels and the vehicle speed of the subject vehicle.

SUMMARY

The driving control device described in the JP2015-069341A, however, does not perform the control in accordance with a determination result as to whether or not an abnormality occurs in the function of executing the lane keeping control.

A problem to be solved by the present invention is to provide a driving control method and a driving control device with which when controlling the subject vehicle by lane keeping control and deviation preventing control, it is possible to determine a situation in which there is a possibility that an abnormality may occur in an execution function of the lane keeping control and to control driving of the subject vehicle in accordance with the determination result.

The present invention solves the above problem through: determining whether or not a second controller starts the deviation preventing control during execution of the lane keeping control with a first controller; and upon a determination that the second controller starts the deviation preventing control during execution of the lane keeping control, concluding the lane keeping control under execution; starting deceleration control for the subject vehicle; continuing the deviation preventing control until the subject vehicle stops by the deceleration control; and concluding the deviation preventing control under execution when the subject vehicle stops by the deceleration control.

According to the present invention, the driving control device determines whether or not the second controller starts the deviation preventing control during execution of the lane keeping control with the first controller, and an effect can therefore be obtained that when controlling the subject vehicle by the lane keeping control and the deviation preventing control, it is possible to determine a situation in which there is a possibility that an abnormality may occur in the execution function of the lane keeping control and to control driving of the subject vehicle in accordance with the determination result.

BRIEF DESCRIPTION OF THE DRAWINGS

FIG. 3 is a flowchart illustrating the procedure of a driving control method executed by the driving control device illustrated in FIG. 1.

DETAILED DESCRIPTION

Hereinafter, one or more embodiments of the present invention will be described with reference to the drawings.

Figure 1:
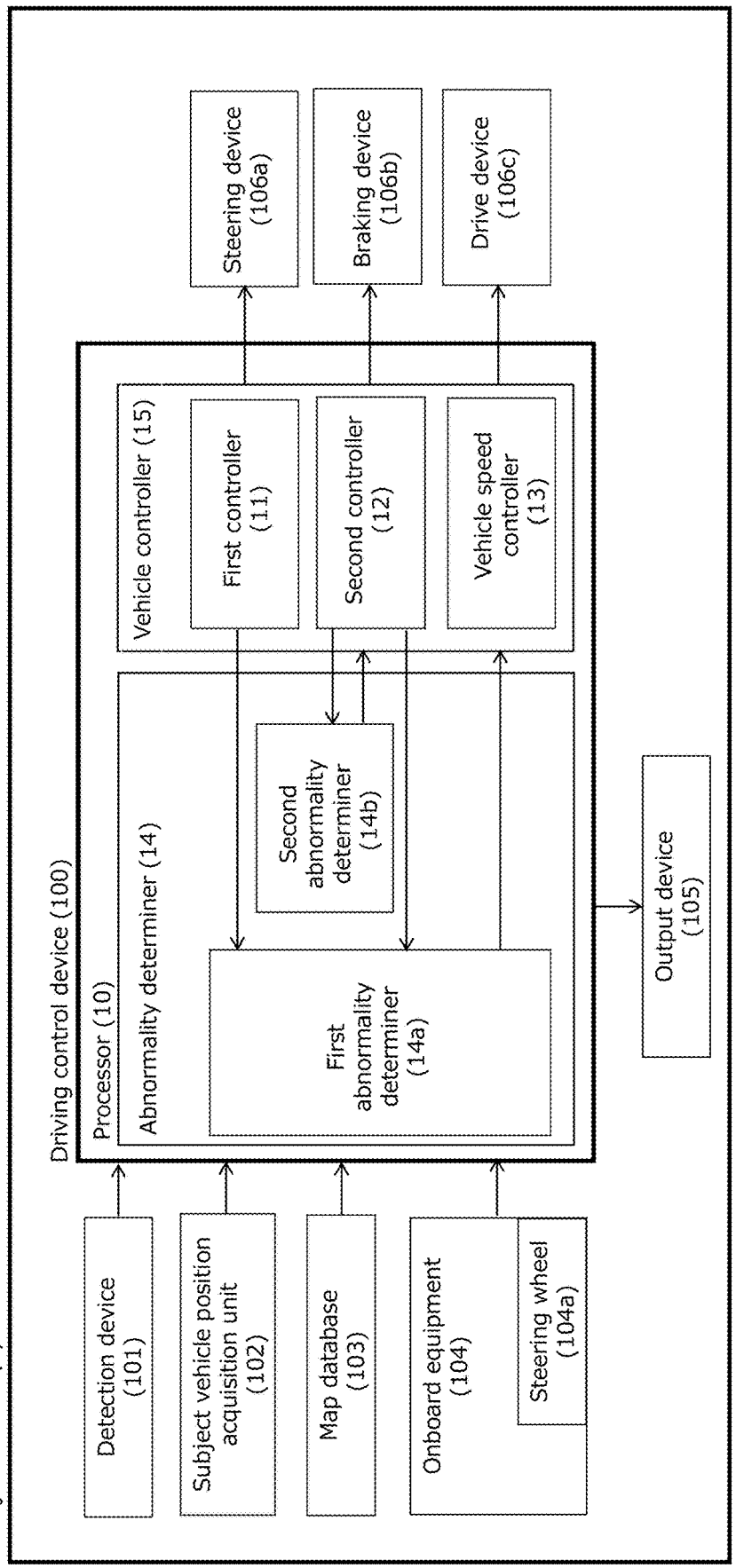
FIG. 1 is a block diagram illustrating the configuration of a driving control device according to an embodiment of the present invention.

FIG. 1 is a block diagram illustrating the configuration of a subject vehicle 1 and a driving control device 100 that controls the autonomous driving of the subject vehicle 1. The subject vehicle 1 includes the driving control device 100, a detection device 101, a subject vehicle position acquisition unit 102, a map database 103, onboard equipment 104, an output device 105, a steering device 106a, a braking device 106b, and a drive device 106c. The driving control device 100 executes the driving assistance control through running programs stored in a ROM using a CPU thereby to control the steering device 106a, braking device 106b, and drive device 106c of the subject vehicle 1.

The detection device 101 is, for example, an onboard camera that captures images around the subject vehicle 1. The detection device 101 detects lane boundary lines B1 and B2 of a travel lane L in which the subject vehicle 1 travels (see FIG. 2). The detection results of the detection device 101 are output to the driving control device 100 at predetermined time intervals.

The subject vehicle position acquisition unit 102 is composed of a GPS unit, a gyro sensor, a vehicle speed sensor, etc. The subject vehicle position acquisition unit 102 detects radio waves sent from multiple satellite communications using the GPS unit, periodically acquires positional information of the subject vehicle 1, and detects the current location of the subject vehicle 1 based on the acquired positional information of the subject vehicle 1, angle change information acquired from the gyro sensor, and the vehicle speed acquired from the vehicle speed sensor. The positional information of the subject vehicle 1 acquired by the subject vehicle position acquisition unit 102 is output to the driving control device 100 at predetermined time intervals.

The map database 103 is a memory that stores high-precision digital map information (high-precision map, dynamic map) including identification information of multiple lanes of a road. The map database 103 is configured such that the driving control device 100 can access the stored information. The map information of the map database 103 also includes information regarding a road and/or a lane curve, the size of the curve (e.g., curvature or curvature radius), etc.

The onboard equipment 104 is a variety of equipment provided in the vehicle and operates by being operated by the driver. The onboard equipment 104 includes a steering wheel 104a. Other types of the onboard equipment 104 include an accelerator pedal, a brake pedal, a navigation device, direction indicators, wipers, lights, horns, and other specific switches. When the onboard equipment 104 is operated by the driver, its information is output to the driving control device 100.

The output device 105 is, for example, a display that outputs character information and/or image information or a speaker that outputs voice information.

The steering device 106a has a steering actuator. The steering actuator includes a motor and the like attached to the column shaft of the steering. The steering device 106a executes the steering control of the subject vehicle 1 based on a steering angle of the steering wheel 104a or control signals input from the driving control device 100. The braking device 106b includes a braking actuator. The braking device 106b controls the brake operation of the subject vehicle 1 based on the stroke amount or the like of the brake pedal (not illustrated) or control signals input from the driving control device 100. The drive device 106c controls the operation of the drive mechanism (including the operation of an internal-combustion engine in the case of an engine car or the operation of an electric motor for travel in the case of an electric car and also including the torque distribution for an internal-combustion engine and an electric motor for travel in the case of a hybrid car) based on the stroke amount or the like of the accelerator pedal (not illustrated) or control signals input from the driving control device 100.

The configuration of the driving control device 100 will be described in detail with reference to FIGS. 1 and 2.

In the following description, the driving control device 100 is assumed to control the driving of the subject vehicle 1 in a hands-off mode. The hands-off mode is a mode in which the driving control device 100 allows the subject vehicle 1 to travel in a state where the driver releases his/her hands from the steering of the subject vehicle 1.

As illustrated in FIG. 1, the driving control device 100 includes a processor 10. The processor 10 is composed of a read only memory (ROM) that stores programs for controlling the driving of the subject vehicle 1, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can be used as the operation circuit. The processor 10 includes an abnormality determiner 14 and a vehicle controller 15. The abnormality determiner 14 has a first abnormality determiner 14a and a second abnormality determiner 14b. The vehicle controller 15 has a first controller 11, a second controller 12, and a vehicle speed controller 13. The first controller 11, the second controller 12, the vehicle speed controller 13, the first abnormality determiner 14a, and the second abnormality determiner 14b execute programs to achieve respective functions of the processor 10.

In FIG. 1, the driving control device 100 is equipped in the subject vehicle 1, but is not limited to this, and the driving control device 100 may be a device that operates the subject vehicle 1 remotely.

Figure 2:
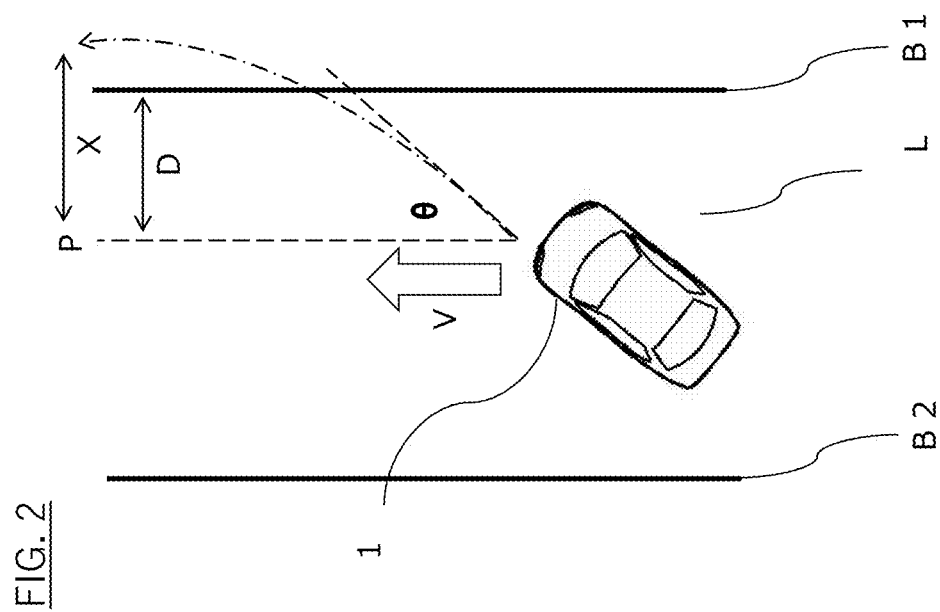
FIG. 2 is a diagram illustrating an example of the positional relationships between a subject vehicle and lane boundary lines when the subject vehicle is determined to deviate from the lane.

The first controller 11 executes lane keeping control for keeping a lateral position P of the subject vehicle 1 to a certain position in the travel lane L (see FIG. 2). When the first controller 11 is executing the lane keeping control, the lateral position P of the subject vehicle 1 is kept near the center of the travel lane L. That is, the first controller 11 keeps the lateral position P of the subject vehicle 1 to a position near the center of the travel lane L, which is the certain position, based on the lane boundary lines B1 and B2 detected by the detection device 101 or the travel lane information stored in the map database 103. More specifically, the first controller 11 controls the steering device 106a in accordance with the influence when switching the acquisition means for information on the travel lane L between the detection device 101 and the map database 103, the influence of the road environment (such as a cant, a change in the curvature of the travel lane L, and the change in the road width) and/or the influence of the crosswind, etc. so as to keep the lateral position P of the subject vehicle 1 to a certain position (a position near the center of the travel lane L) without giving uncomfortable feeling to the driver. Additionally or alternatively, the first controller 11 may execute the lane keeping control through controlling the braking device 106b thereby to adjust the yaw angle of the subject vehicle 1.

The second controller 12 executes deviation preventing control for preventing deviation of the subject vehicle 1 from the travel lane L based on the positions of the lane boundary lines B1 and B2 detected by the detection device 101. When at least a part of the vehicle body of the subject vehicle 1 deviates from the lane boundary lines B1 and B2 of the travel lane L, the second controller 12 starts the deviation preventing control and controls the steering device 106a to adjust the direction of the subject vehicle 1 so that it returns inside the travel lane L. Additionally or alternatively, the second controller 12 may execute the deviation preventing control through controlling the braking device 106b thereby to adjust the yaw angle of the subject vehicle 1.

Even while the first controller 11 is working properly, the function of the deviation preventing control of the second controller 12 is in the ON state. "The second controller 12 starting the deviation preventing control" refers to the second controller 12 starting output of a control signal to the vehicle controller 15 based on the function of the deviation preventing control. "The second controller 12 continuing the deviation preventing control" refers to the second controller 12 outputting the control signal continuously to the vehicle controller 15 based on the function of the deviation preventing control.

Additionally or alternatively, when predicting that at least a part of the vehicle body of the subject vehicle 1 will deviate from the lane boundary lines B1 and B2 of the travel lane L, the second controller 12 may control the steering device 106a to adjust the traveling direction of the subject vehicle 1 so that it stays inside the travel lane L. Specifically, when the direction of the subject vehicle 1 is not parallel to the direction of extension of the travel lane L as illustrated in FIG. 2, the second controller 12 calculates a shortest time T1 required until the direction of the subject vehicle 1 becomes parallel to the direction of extension of the travel lane L. Then, the second controller 12 calculates a lateral movement amount X of the subject vehicle 1 assuming that the direction of the subject vehicle 1 becomes parallel to the direction of extension of the travel lane L after the shortest time T1 has elapsed. When the lateral movement amount X is larger than a distance D between the current lateral position P of the vehicle and the lane boundary line B1 (X>D), the second controller 12 predicts that at least a part of the vehicle body of the subject vehicle 1 will deviate from the lane boundary line B1 of the travel lane L, and starts the deviation preventing control. On the other hand, when the lateral movement amount X is not larger than the distance D between the current lateral position P of the vehicle and the lane boundary line B1 (X≤D), the second controller 12 predicts that the subject vehicle 1 will not deviate from the travel lane L, and does not start the deviation preventing control.

Methods of calculating the shortest time T1 and the lateral movement amount X will be described further specifically.

First, the second controller 12 acquires a steering speed limit value δ' of the subject vehicle 1.

Next, the second controller 12 obtains a steering angle change amount δ(t) by integrating the steering speed limit value δ' over a time t and adds it to a current initial steering angle δ(0) to create the following equation (1) which represents a steering angle δ after the time t has elapsed.

$$\delta = \delta(0) + \delta(t) \tag{1}$$

After that, the second controller 12 converts the above equation (1) to an equation that represents a vehicle body angle change rate θ' (yaw rate), according to a vehicle model of the subject vehicle 1. Then, the second controller 12 integrates the vehicle body angle change rate θ' (yaw rate) over the time t to calculate a vehicle body angle change amount θ(t). Thereafter, the second controller 12 adds the body angle change amount θ(t) to a current initial vehicle body angle θ(0) to create the following equation (2) which represents a vehicle body angle θ after the time t has elapsed. Note that the equation (2) is a quadratic function of the time t because the integral over the time (t) is performed twice when creating the equation (2).

$$\theta = \theta(0) + \theta(t) \qquad (2)$$

The second controller 12 calculates the time t when θ=0 based on the above equation (2). The time T when θ=0 is the "shortest time T1 required until the direction of the subject vehicle 1 becomes parallel to the direction of extension of the travel lane L."

Furthermore, the second controller 12 generates, based on the vehicle speed V and vehicle body angle change amount θ(t) of the subject vehicle 1, the following equation (3) which represents a lateral movement speed Vy(t) of the subject vehicle 1.

$$Vy(t) = V \times \sin\theta(t) \qquad (3)$$

Then, the second controller 12 integrates the Vy(t) represented by the above equation (3) over the shortest time T1 to calculate the lateral movement amount X. The second controller 12 compares this lateral movement amount X with the distance D from the current lateral position P of the subject vehicle 1 to the lane boundary line B1 thereby to determine whether or not the subject vehicle 1 deviates from the travel lane L.

In the case in which the second controller 12 starts the deviation preventing control when the driving control device 100 controls the driving of the subject vehicle 1 in the hands-off mode, the output device 105 may output hands-on request information that requests the driver to grasp the steering wheel 104a of the subject vehicle 1. After the control initiative has returned to the driver, the driving control device 100 may stop the driving assistance control which includes the lane keeping control and the deviation preventing control.

The vehicle speed controller 13 illustrated in FIG. 1 controls the braking device 106b and the drive device 106c thereby to control the vehicle speed V and acceleration/deceleration of the subject vehicle 1.

The first abnormality determiner 14a determines whether or not an abnormality occurs in the first controller 11 (whether or not the first controller 11 fails). Specifically, the first abnormality determiner 14a determines whether or not the second controller 12 starts the deviation preventing control during execution of the lane keeping control with the first controller 11. When the second controller 12 starts the deviation preventing control during execution of the lane keeping control, it is highly possible that the lane keeping control is not working properly, and the first abnormality determiner 14a therefore determines that an abnormality occurs in the first controller 11.

In the present embodiment, "an abnormality occurring" means that a function to execute control fails.

When the first abnormality determiner 14a determines that an abnormality occurs in the first controller 11 (the first controller 11 fails), that is, when the second controller 12 starts the deviation preventing control during execution of the lane keeping control, the first controller 11 concludes the lane keeping control. When the first abnormality determiner 14a determines that an abnormality occurs in the first controller 11, the processor 10 outputs an alarm including the hands-on request information to the output device 105. Furthermore, the vehicle speed controller 13 outputs control signals to the braking device 106b and the drive device 106c and starts deceleration control of the subject vehicle 1. The second controller 12 continues the deviation preventing control until the subject vehicle 1 decelerated by the deceleration control stops, and when the subject vehicle 1 stops, the second controller 12 concludes the deviation preventing control. If manual driving by the driver starts during the deceleration of the subject vehicle 1, the vehicle speed controller 13 will conclude the deceleration control before the subject vehicle 1 stops.

On the other hand, even when the deviation preventing control is not executed, the second abnormality determiner 14b is always determining whether or not an abnormality occurs in the second controller 12 (whether or not the second controller fails). That is, before the second controller 12 starts the deviation preventing control, the second abnormality determiner 14b determines whether or not an abnormality occurs in the second controller 12. When the second abnormality determiner 14b determines that an abnormality occurs in the second controller 12, the processor 10 of the driving control device 100 concludes the driving assistance control which includes the lane keeping control and the deviation preventing control. When detecting a system error of the second controller 12, the second abnormality determiner 14b determines that an abnormality occurs in the second controller 12. The second abnormality determiner 14b is determining whether a periodically calculated internal calculation result deviates from a reference value by a predetermined value or more. This predetermined value is appropriately set based on the experimental results, etc., depending on the system used. The second controller 12 performs the control so that the subject vehicle 1 does not deviate from the travel lane L, while the first controller 11 performs calculation so that the subject vehicle 1 travels along a route on the center of the lane during execution of the driving assistance control for the subject vehicle 1, so the number of internal calculations by the first controller 11 is large. Thus, the number of internal calculations in the first controller 11 is larger than that in the second controller 12, and the output values are generated by integrating these calculation results, so it is difficult for the first abnormality determiner 14a to determine a deviation in the internal calculation result of the first controller 11. Moreover, even if the output value obtained by integrating a large number of calculation results is fixed, each internal calculation may be different, and it is difficult for the first abnormality determiner 14a to accurately determine a deviation in the internal calculation result of the first controller 11.

In the case in which the abnormality determiner 14 determines that an abnormality occurs in the first controller 11 or the second controller 12 when the driving control device 100 is executing the driving assistance control of the subject vehicle 1 in the hands-on mode, the driving control device 100 may control the subject vehicle 1 so as not to allow the driving assistance mode to transition to the hands-off mode.

The procedure of the driving control method executed by the driving control device 100 will then be described with reference to FIG. 3.

First, in step S1, the second abnormality determiner 14b determines whether or not an abnormality occurs in the second controller 12. When an abnormality occurs in the second controller 12, the driving control device 100 concludes the driving assistance control in step S8.

Then, in Step S2, the first abnormality determiner 14a determines whether or not the second controller 12 starts the deviation preventing control during execution of the lane keeping control with the first controller 11. When the second controller 12 does not start the deviation preventing control during execution of the lane keeping control with the first controller 11, the process is concluded.

When the first abnormality determiner 14a determines in step S2 that the second controller 12 starts the deviation preventing control during execution of the lane keeping control with the first controller 11, the first abnormality determiner 14a determines in step S3 that an abnormality occurs in the first controller 11. This determination may include one or more specific determinations such as determining based on external information or the like whether there is a strong crosswind more than a predetermined strength and determining from the map information whether there is a large cant more than a predetermined value on the road surface, and when the driving control device 100 preliminarily obtains information on a point at which a determination is made that it is difficult for the subject vehicle 1 to travel in the lane by the lane keeping control, the determination at that point may be suspended as to whether there is an abnormality in the first controller 11.

Then, in step S4, the first controller 11 concludes the lane keeping control.

Furthermore, in step S5, the vehicle speed controller 13 starts the deceleration control.

The process of step S4 and the process of step S5 may be performed simultaneously, or the process of step S4 may be performed after the process of step S5.

Then, in step S6, the driving control device 100 determines whether or not the subject vehicle 1 after deceleration has stopped. When determining that the subject vehicle 1 has not stopped, the driving control device 100 continues to make a determination in step S6 in a state of keeping on the deviation preventing control. On the other hand, when the driving control device 100 determines that the subject vehicle 1 has stopped, the second controller 12 concludes the deviation preventing control in step S7.

As described above, when a determination is made that the second controller 12 starts the deviation preventing control during execution of the lane keeping control with the first controller 11, the processor 10 of the driving control device 100 according to the present embodiment concludes the lane keeping control under execution, starts the deceleration control for the subject vehicle 1, continues the deviation preventing control until the subject vehicle 1 stops by the deceleration control, and concludes the deviation preventing control under execution when the subject vehicle stops by the deceleration control. Here, the situation in which the second controller 12 starts the deviation preventing control during execution of the lane keeping control with the first controller 11 indicates that the subject vehicle 1 will deviate from the travel lane L or may possibly deviate from the travel lane L because the lane keeping control function of the first controller 11 is not fully exerted. That is, when the second controller 12 starts the deviation preventing control during execution of the lane keeping control with the first controller 11, there is a possibility that an abnormality may occur in the first controller 11 (the first controller 11 fails). Accordingly, the driving control device 100 determines whether or not the second controller 12 starts the deviation preventing control during execution of the lane keeping control with the first controller 11, thereby to determine a situation in which there is a possibility that an abnormality may occur in the execution function of the lane keeping control, and can control the driving of the subject vehicle in accordance with the determination result. Moreover, when starting the deviation preventing control during execution of the lane keeping control, that is, even when there is a possibility that an abnormality may occur in the execution function of the lane keeping control, the second controller 12 continues the deviation preventing control until the subject vehicle 1 stops, and concludes the deviation preventing control when the subject vehicle 1 stops. Through this operation, when an abnormality occurs in the function of executing the lane keeping control, the driving control device 100 can stop the subject vehicle 1 while preventing the deviation of the subject vehicle 1 from the travel lane L and conclude the driving assistance control.

Additionally or alternatively, upon the determination that the second controller 12 starts the deviation preventing control during execution of the lane keeping control when driving of the subject vehicle 1 is controlled in the hands-off mode, the processor 10 of the driving control device 100 outputs the hands-on request information that requests the driver to grasp the steering wheel 104a of the subject vehicle 1. Through this operation, when an abnormality occurs in the function of executing the lane keeping control, the driver can grasp the steering wheel 104a to start the manual driving while the driving control device 100 is continuing the deviation preventing control.

Additionally or alternatively, upon a determination that the second controller 12 starts the deviation preventing control during execution of the lane keeping control, the processor 10 of the driving control device 100 determines that an abnormality has occurred in the first controller 11 (the first controller 11 has failed). This allows the driving control device 100 to efficiently determine the presence or absence of an abnormality (failure) of the first controller 11 without using an abnormality determination device having a complicated configuration.

Additionally or alternatively, before the second controller 12 starts the deviation preventing control, the processor 10 of the driving control device 100 determines whether or not an abnormality occurs in the second controller 12 (whether or not the second controller 12 fails), and when the abnormality occurs in the second controller 12, the processor 10 concludes the driving assistance control. This allows the driving control device 100 to prevent a situation in which the presence or absence of an abnormality of the first controller 11 cannot be accurately determined due to an abnormality occurring in the second controller 12.

DESCRIPTION OF REFERENCE NUMERALS

100 . . . Driving control device
1 . . . Subject vehicle
10 . . . Processor
11 . . . First controller
12 . . . Second controller
14 . . . Abnormality determiner 15 ... Vehicle controller
104a ... Steering wheel
L ... Travel lane

The invention claimed is:

1. A driving control method for executing autonomous driving assistance control for a subject vehicle using a processor having a first controller and a second controller, the first controller executing lane keeping control for keeping a lateral position of the subject vehicle to a certain position in a travel lane, the second controller executing deviation preventing control for preventing deviation of the subject vehicle from the travel lane, the processor operating to:
determine that the second controller starts outputting a control signal of the deviation preventing control to the processor during execution of the lane keeping control with the first controller;
conclude the lane keeping control under execution;
start deceleration control for the subject vehicle;
continue outputting the control signal of the deviation preventing control until the subject vehicle stops by the deceleration control; and
conclude the deviation preventing control under execution when the subject vehicle stops by the deceleration control.

2. The driving control method according to claim 1, wherein the processor operates to,
upon a determination that the second controller starts outputting the control signal, output hands-on request information that requests a driver to grasp a steering wheel of the subject vehicle.

3. The driving control method according to claim 1, wherein the processor operates to,
upon a determination that the second controller starts outputting the control signal, determine that an abnormality occurs in the first controller.

4. The driving control method according to claim 1, wherein the processor operates to:
before the second controller starts outputting the control signal, determine that an abnormality occurs in the second controller; and
when the abnormality occurs in the second controller, conclude the driving assistance control.

5. A driving control device for executing autonomous driving assistance control for a subject vehicle, comprising:
a vehicle controller having a first controller and a second controller, the first controller executing lane keeping control for keeping a lateral position of the subject vehicle to a certain position in a travel lane, the second controller executing deviation preventing control for preventing deviation of the subject vehicle from the travel lane,
the vehicle controller operating to:
determine that the second controller starts outputting a control signal of the deviation preventing control to the vehicle controller during execution of the lane keeping control with the first controller;
conclude the lane keeping control under execution;
start deceleration control for the subject vehicle;
continue outputting the control signal of the deviation preventing control until the subject vehicle stops by the deceleration control; and
conclude the deviation preventing control under execution when the subject vehicle stops by the deceleration control.

* * * * *